(12) United States Patent
Patro (10) Patent No.: US 11,736,306 B1
(45) Date of Patent: Aug. 22, 2023

(54) SYSTEM, METHOD, AND COMPUTER PROGRAM FOR USING ARTIFICIAL INTELLIGENCE FOR ONLINE CHARGING

(71) Applicant: Amdocs Development Limited, Limassol (CY)

(72) Inventor: Debabrata Patro, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 298 days.

(21) Appl. No.: 17/229,689

(22) Filed: Apr. 13, 2021

(51) Int. Cl.
*H04L 12/14* (2006.01)
*G06N 20/00* (2019.01)

(52) U.S. Cl.
CPC ......... *H04L 12/1414* (2013.01); *G06N 20/00* (2019.01); *H04L 12/1407* (2013.01); *H04L 12/1457* (2013.01)

(58) Field of Classification Search
CPC ............. H04L 12/1414; H04L 12/1407; H04L 12/1457; G06N 20/00
See application file for complete search history.

(56) References Cited

U.S. PATENT DOCUMENTS

| | | | |
|---|---|---|---|
| 10,476,891 | B2 | 11/2019 | Vissamsetty et al. |
| 10,560,434 | B2 | 2/2020 | Bingham et al. |
| 10,574,697 | B1 | 2/2020 | McClintock et al. |
| 2003/0152039 | A1* | 8/2003 | Roberts ................. H04M 15/41 370/255 |
| 2018/0167412 | A1 | 6/2018 | Barrett et al. |
| 2020/0053123 | A1 | 2/2020 | Pliskin et al. |
| 2020/0137096 | A1 | 4/2020 | Endler |

FOREIGN PATENT DOCUMENTS

KR  20200035614 A  4/2020

OTHER PUBLICATIONS

Wray, "AI and edge computing trialled to reduce telco bill strain," TM Forum, Nov. 2019, 17 pages. Retrieved from https://inform.tmforum.org/catalyst/2019/11/ai-and-edge-computing-trialled-to-reduce-telco-bill-strain/.

* cited by examiner

*Primary Examiner* — Curtis B Odom
(74) *Attorney, Agent, or Firm* — Zilka-Kotab, P.C.

(57) ABSTRACT

As described herein, a system, method, and computer program are provided for using artificial intelligence for online charging. A request for use of a network service by an entity is identified. Account allowances/balances to which the requested use of the network service can be charged are determined. Insights generated by an artificial intelligence system are accessed, where the insights predict future use of the network service (e.g. that will be charged to each account allowance/balance). A quota size to be requested in association with a select account allowance/balance is determined, based on the request for the use of the network service and the insights. A reservation request to reserve the quota size from the select account allowance/balance is generated. The use of the network service is authorized, when the quota size is reserved from the select account allowance/balance for the use of the network service.

20 Claims, 6 Drawing Sheets

SYSTEM, METHOD, AND COMPUTER PROGRAM FOR USING ARTIFICIAL INTELLIGENCE FOR ONLINE CHARGING

FIELD OF THE INVENTION

The present invention relates to online charging techniques.

BACKGROUND

An online charging mechanism allows the network operators to decide, in real-time, whether to give service to the network user and for what amount of units (e.g. allow a voice call for 5 minutes before checking back again, allow to browse for 1 megabyte (MB) data or 1 minute whichever is earlier, etc.). This process requires a direct interaction of the charging mechanism with the control of network resource usage in an interactive manner so as to periodically check about service authorization.

Traditionally, the authorization for service is based on a "quota" requested by the network equipment or decided by the charging system based on a fixed configuration (e.g. for data browsing event, the quota is 2 MB and for local voice events, the quota size is 5 minutes). The charging system checks whether the balance/allowance to which the event is to be charged is sufficient to cover the "quota" amount of service and if yes, it reserves that amount of money/allowance and authorizes the event by informing the network of the reserved service units (RSU). Once the user is about consume the reserved quota, the network again contacts the charging system to ask for a subsequent authorization. This process continues until either the network user stops using the service (e.g. disconnects the call) or the balance and allowance to which the user's event is to be charged is insufficient to authorize the quota.

With increased communication network usage, including more and more use of data services which by nature are long running and with increasingly reliable network services, the number of times the network has to communicate with the charging system during the course of a user session is increasing significantly. This has an adverse impact on the processing power required on both the network as well as the charging system, and further it introduces the need for increased network bandwidth between them.

Some existing solutions to this problem employ a dynamic quota instead of a fixed quota whereby depending on the remaining balance/allowance, the quota size is changed. For example, if the user has a balance of 10 gigabyte (GB) data, the charging system gives an authorization of 1 GB instead of 2 MB defined as the standard quota size in reference, but if the available allowance is lower than a threshold of say 50 MB, the system reverts back to the standard quota size of 2 MB.

While this "dynamic quota" is useful to reduce the amount of back and forth communications between the network and charging system, it does not take into account the scenario of shared allowance and shared balance whereby multiple users events can be charged to the same allowance or balance. For example, a family plan can allow a shared allowance of 20 GB for a family of 3 with each individual having access to the shared allowance but not having any allowance that is dedicated to each individual. In such a scenarios, reserving large amounts of "quota" can have an impact on the experience of the other users sharing the same balance/allowance. This also does not take into account user's behavior or the way the balance or allowance is used (either dedicated to individual users or shared among users) when using the different services (e.g. spending lot of time on social media sites but spending very short time on news sites, etc.).

There is thus a need for addressing these and/or other issues associated with the prior art.

SUMMARY

As described herein, a system, method, and computer program are provided for using artificial intelligence for online charging. A request for use of a network service by an entity is identified. Each account allowance or balance of a plurality of account allowances or balances to which the requested use of the network service can be charged is determined. Insights generated by an artificial intelligence system are accessed, where the insights predict at least one of: for each account allowance or balance of the plurality of account allowances or balances instances of future use of the network service that will be charged to the account allowance or balance, or future use of the network service by other entities. A quota size to be requested in association with a select account allowance or balance of the plurality of account allowances or balances is determined, based on the request for the use of the network service and the insights. A reservation request to reserve the quota size from the select account allowance or balance is generated. The use of the network service is authorized, when the quota size is reserved from the select account allowance or balance for the use of the network service.

DETAILED DESCRIPTION

Figure 1:
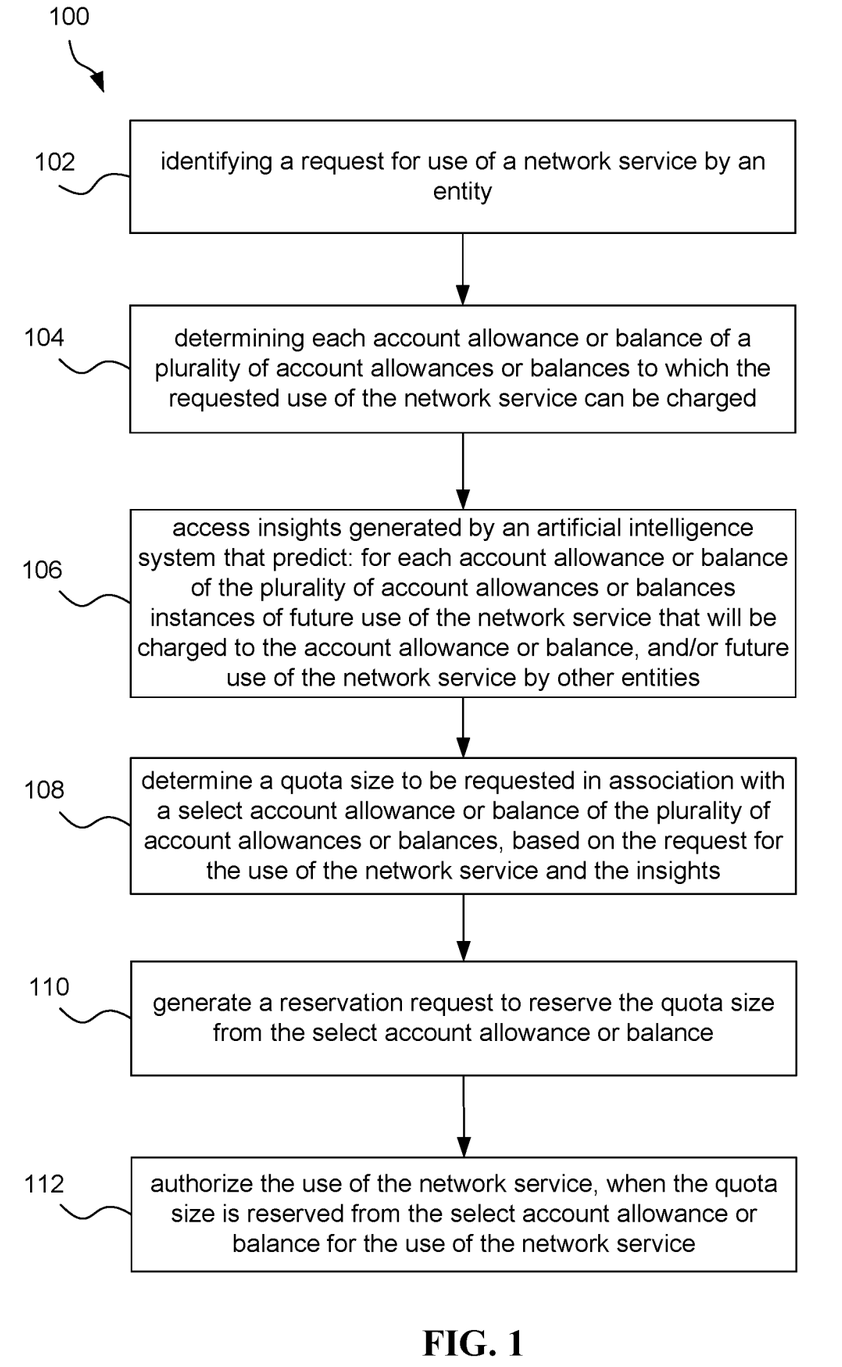
FIG. 1 illustrates a method for using artificial intelligence for online charging, in accordance with one embodiment.

FIG. 1 illustrates a method 100 for using artificial intelligence for online charging, in accordance with one embodiment. The method 100 may be performed by any computer system described below with respect to FIGS. 5 and/or 6. For example, the method 100 may be performed by a local computer system of an online charging (e.g. of a network service provider) or a computer system remotely located from, but in communication with, the online charging system. The online charging system refers to a computer system that performs online (i.e. real-time) charging for network service usage.

In operation 102, a request for use of a network service by an entity is identified. In one embodiment, the network service may be a communication service, such as an Internet service, voice service, etc. The entity may be end user device, as an option. Additionally, the request may be received prior to establishing a session for the use of the network service.

In operation 104, each account allowance or balance of a plurality of account allowances or balances to which the requested use of the network service can be charged is determined. In one embodiment, the plurality of account allowances or balances may include at least one individual (i.e. not shared) account allowance or balance specific to the entity or a user of the entity, and also at least one shared account allowance or balance shared by the entity or a user of the entity and at least one additional entity or additional user.

In operation 106, insights generated by an artificial intelligence system are accessed, where the insights predict at least one of: for each account allowance or balance of the plurality of account allowances or balances instances of future use of the network service that will be charged to the account allowance or balance, or future use of the network service by other entities. Thus, the insights may predict: future use of the network service that will be charged to each account allowance or balance determined in operation 104 and/or or future use of the network service by other entities.

In one embodiment, the insights may be generated by the artificial intelligence system by inputting historical usage data to a machine learning model of the artificial intelligence system that outputs the insights. In one embodiment, the machine learning model be may be trained to predict future network service usage, per account allowance/balance, based on historical usage data recorded for those account allowances/balances. In this case, the historical usage data may indicate a plurality of past network service usage events (e.g. corresponding to the entity), and, for each past network service usage event of the plurality of past network service usage events, a particular (individual or shared) account allowance or balance to which the past network service usage event was charged.

In another embodiment, the machine learning model be may be trained to predict future network service usage per network service. For example, this embodiment may be employed in the absence of per account allowance/balance insights. In this case, the historical usage data may indicate a plurality of past network service usage events corresponding to any entity. Further, in any embodiment, each past network service usage event may indicate a particular network service used, a particular entity that used the particular network service, and a timestamp (e.g. time, day, week, month, duration, etc.) of the use of the particular network service.

In operation 108, a quota size to be requested in association with a select account allowance or balance of the plurality of account allowances or balances is determined, based on the request for the use of the network service and the insights. The quota size refers to an amount of the account allowance or balance to be reserved for the use of the network service. The quota size to be requested may be determined using predefined policies. For example, the predefined policies may indicate various quota sizes to be used for various combinations of request parameters (e.g. time, entity, user, network service, etc.) and insight parameters (e.g. predicted use per time, entity, user, network service, etc.).

In one embodiment, a remaining allowance or balance is determined for each account allowance or balance to which the requested use of the network service can be charged. Further to this embodiment, the quota size to be requested may be further determined based on the remaining allowance or balance of each account allowance or balance. Thus, the policies, as described above, may also take into consideration remaining allowance or balance per account allowance or balance.

In operation 110, a reservation request to reserve the quota size from the select account allowance or balance is generated. In operation 112, the use of the network service is authorized, when the quota size is reserved from the select account allowance or balance for the use of the network service. On the other and, when the quota size is not reserved from the select account allowance or balance, the use of the network service may be denied. Alternatively, when the quota size is not reserved from the select account allowance or balance, the method 100 may repeat operations 108-112 to determine and reserve another quota size from another select account allowance or balance, and to authorize the use of the network service accordingly.

To this end, the method 100 may be performed to provide artificial intelligence-based online charging for use of a network service. By more intelligently determining quota size per network service request, the method 100 may help in reducing a number of quota reservation and associated authorization requests from the network to the charging system, thereby helping to optimize the hardware and network costs for the charging system as well as the communication network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
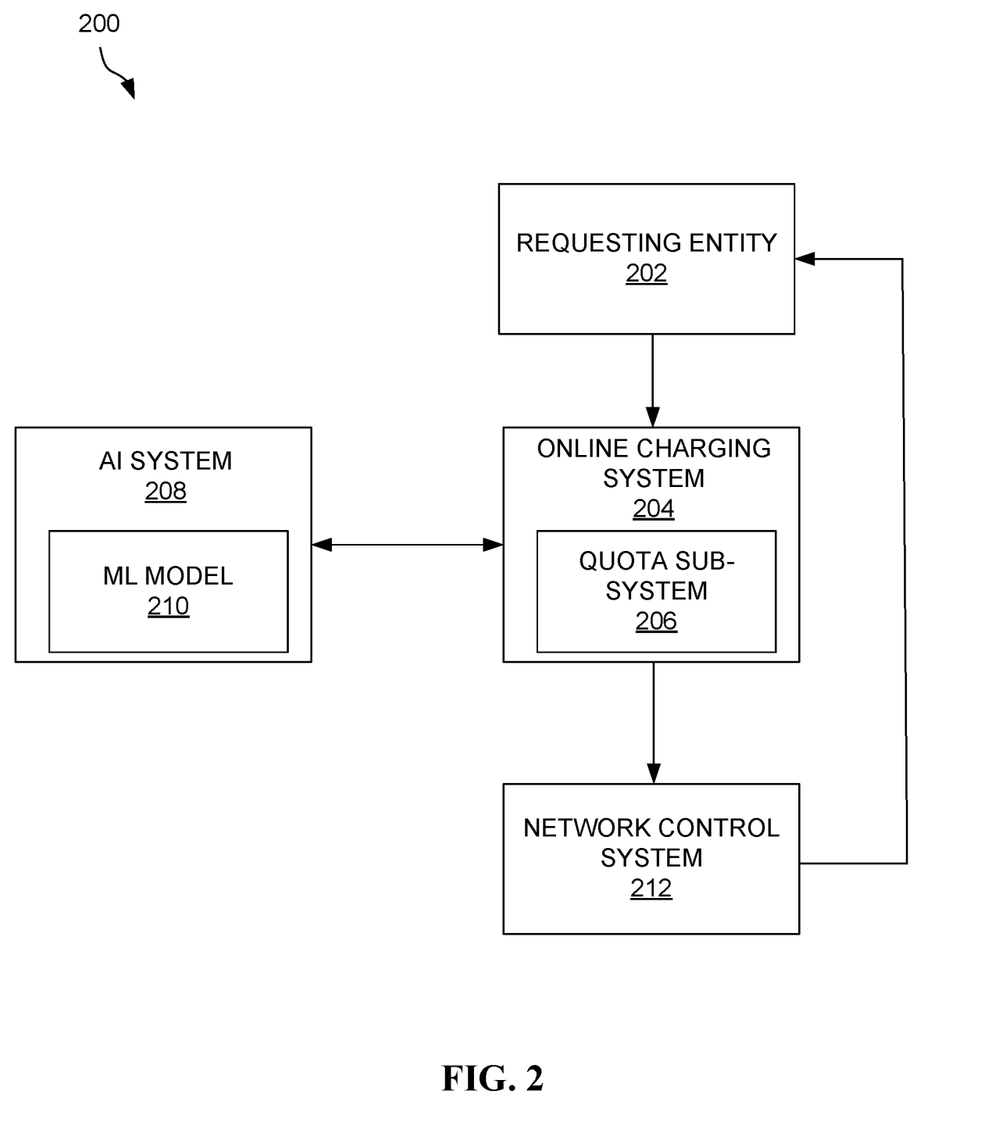
FIG. 2 illustrates a system for using artificial intelligence for online charging, in accordance with one embodiment.

FIG. 2 illustrates a system 200 for using artificial intelligence for online charging, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a requesting entity 202 that communicates, either directly or indirectly, with an online charging system 204 to request use of a network service. The requesting entity 202 may be an end user device connected to a network for accessing the network service. The online charging system 204 may be a component of a provider/operator system that provides the network service.

When the requesting entity 202 requests use of the network service, the online charging system 204 determines available account allowances/balances to which the use of the network service can be charged, such as account allowances/balances corresponding to the requesting entity 202 and/or a user of the requesting entity 202. The online charging system 204 also determines an available allowance/balance for each of the available account allowances/balances.

The online charging system 204 communicates with an artificial intelligence (AI) system 208 to obtain insights for the account allowances/balances and/or for the network service. The insights are generated by a machine learning model 210 of the AI system 208 based on historical usage data for the network service (e.g. by the requesting entity 202 and/or other entities). The insights are predictions of at least one of: for each account allowance/balance, of future use of the network service that will be charged to the account allowance/balance, or future use of the network service by other entities.

The online charging system 204 includes a quota subsystem 206 that determines a quota size to be reserved from a select account allowance/balance of the available account allowances/balances. The quota size is determined based on parameters of the request for the use of the network service, the insights, and the available allowance/balance for each of the available account allowances/balances. The quota subsystem 206 may determine the quota size for the select account allowance/balance based on policies or artificial intelligence.

The online charging system 204 requests to reserve the quota size from the select account allowance/balance. When the quota size is reserved, the online charging system 204 informs a network control system 212 that the requesting entity 202 is authorized to use the network service. In this case, when the reserved quota is exhausted, or close to exhausted, by the requesting entity 202, the requesting entity 202 may issue a new request to use the network service and the process described above is repeated.

On the other and, when the quota size is not reserved from the select account allowance/balance, the use of the network service may be denied. Alternatively, when the quota size is not reserved from the select account allowance/balance, the online charging system 204 may be prompted to determine and reserve another quota size from another select account allowance/balance, and to authorize the use of the network service accordingly.

Figure 3:
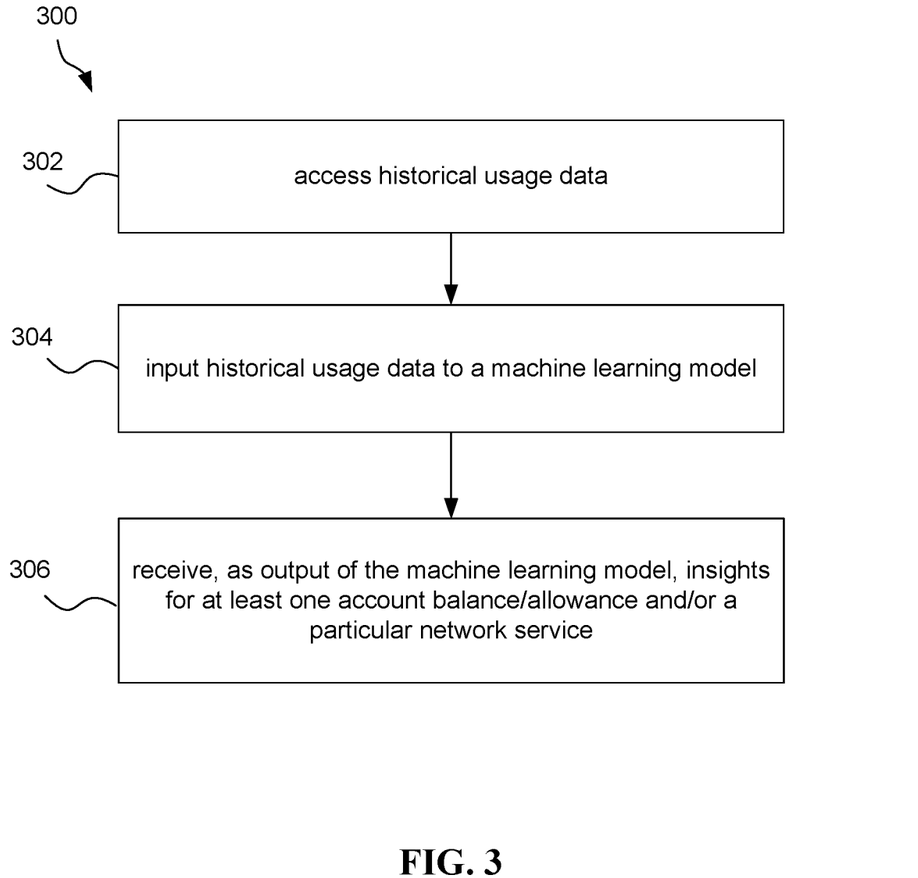
FIG. 3 illustrates a method for generating insights for an account allowance/balance by an artificial intelligence system, in accordance with one embodiment.

FIG. 3 illustrates a method 300 for generating insights for an account allowance/balance by an artificial intelligence system, in accordance with one embodiment. As an option, the method 300 may be carried out in the context of the details of the previous figure and/or any subsequent figure(s). For example, the method 300 may be performed by the AI system 208 of FIG. 2. Of course, however, the system 300 may be carried out in the context of any desired environment. Further, the aforementioned definitions may equally apply to the description below.

In operation 302, historical usage data is accessed. The charging system has detailed record of all the network service used by all entities/users. This includes information about the network service usage as well as information about how each of those network service usage events were paid for (i.e. either by the user's own account balance/allowance or charged to a shared account balance/allowance). For example, a user who is an employee of a corporate entity can have all her data events charged to the corporate shared allowance (and once the shared allowance is exhausted, charged to the corporate balance), whereas she will be paying for all voice and short message service ( (SMS) message events on her own account balance/allowance.

In operation 304, the historical usage data is input to a machine learning model. In operation 306, insights for at least one account balance/allowance and/or for a particular network service are received as output by the machine learning model. In one embodiment, the insights indicate predictions of use of network services, including for each network service usage a charge to be made to a particular individual account allowance/balance or a shared account allowance/balance, an indication of the network service, the entity or user that will use the network service, a day of week and time of day that the network service will be used, etc.

The machine learning model may thereby be able to predict, for example, if a shared allowance of a family is used by 1 or 2 or all 3 members of the family in the evening hours with average session size of 200 MB and duration of 2 hours while typically used by only 1 user during the day time with average data session size of 50 MB and duration of 8 hours, whereas the corporate shared balance is used only toward the last week of the month by 100 users during the office hours with average voice call duration of 1 hour to specific numbers (e.g. conference bridge number), average call duration of 10 minutes to other landline numbers and so on and almost no use of voice calls at night.

In another embodiment, the insights indicate predictions of usage of the network service by any entity and to be charged to any account balance/allowance. For example, in the absence of user specific prediction of network service usage (e.g. where historical usage data for a particular account allowance/balance is not available), the network service specific usage across all other users may be provided. For example, there may be a situation involving a newly created subscriber on the network who does not have any usage history. When the user dials up a conference call bridge number, even though there is no historical data is available for the user, historical usage data may indicate that calls to the conference call bridge numbers are typically very long as opposed to calls to a regular phone number. The insights may reflect these trends. As mentioned in FIG. 4, a corresponding quote size may be determined, such as, in the present example, a higher quota size for use of the conference call bridge number versus a standard quota size for use of the regular phone number.

Figure 4:
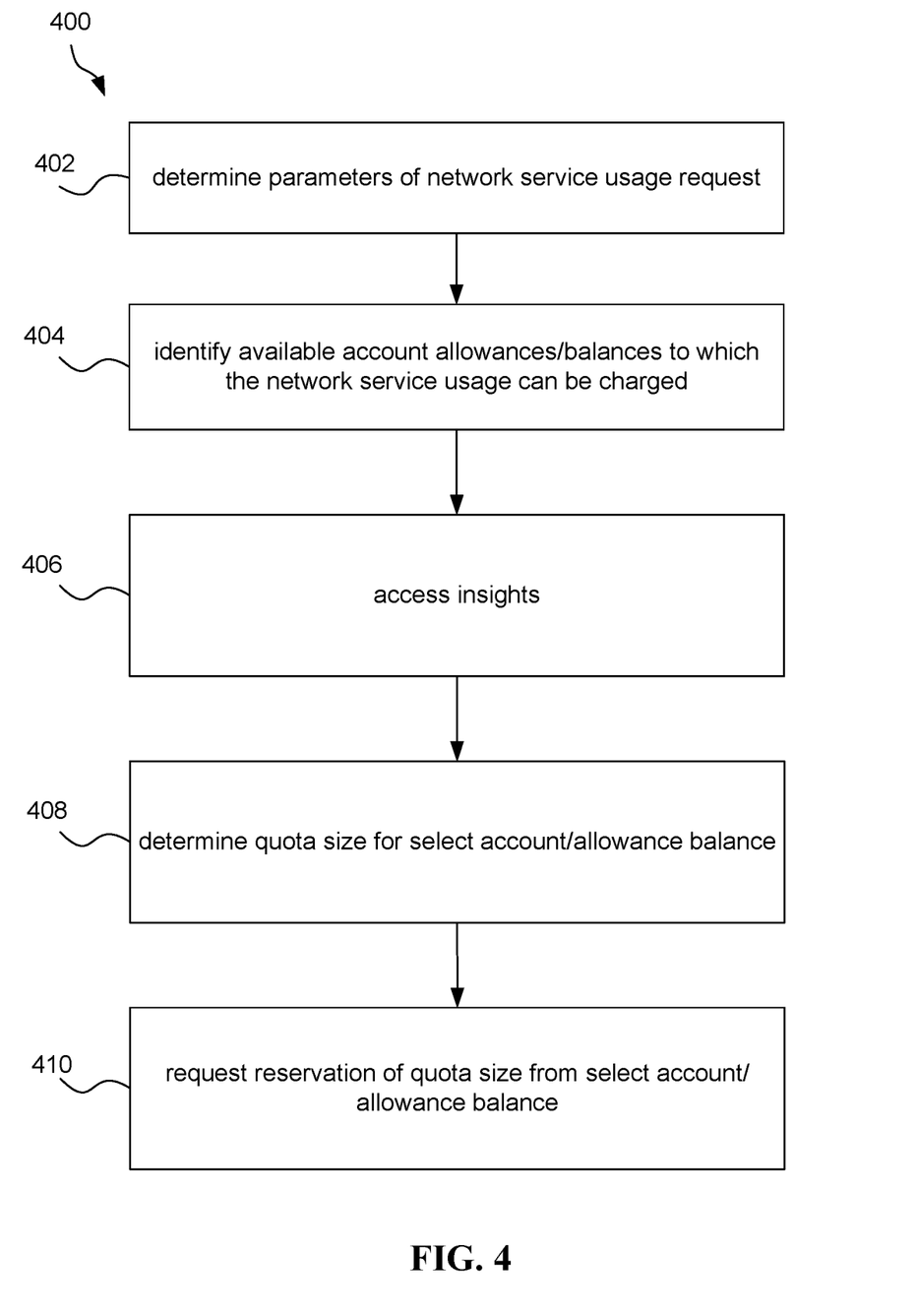
FIG. 4 illustrates a method for using insights generated by an artificial intelligence system to make a quota reservation, in accordance with one embodiment.

FIG. 4 illustrates a method 400 for using insights generated by an artificial intelligence system to make a quota reservation, in accordance with one embodiment. As an option, the method 400 may be carried out in the context of the details of the previous figure and/or any subsequent figure(s). For example, the method 400 may be carried out by the online charging system 204 of FIG. 2. Of course, however, the system 400 may be carried out in the context of any desired environment. Further, the aforementioned definitions may equally apply to the description below.

In operation 402, parameters of a network service usage request are determined. The parameters may include a type of network service requested to be accessed, a time of the requested access, an entity or user requesting the access, etc. In operation 404, available account allowances/balances to which the network service usage can be charged are identified. A remaining allowance/balance of each of those available account allowances/balances may also be determined.

In operation 406, insights are accessed (e.g. for the available account allowances/balances and/or the network service). Thus, the insights may be accessed based on the network service usage request. In operation 408, a quota size for a select account allowance/balance is determined. In particular, the quota size is determined based on the parameters of the network service usage request, the insights, and the remaining allowance/balance of each of the available account allowances/balances.

For example, using the insights for the available account allowances/balances, the quota size to be used from one of the available account allowances/balances may be determined. For example, it is inferred that there are likely to be N number of other users who will use the network service in the coming minutes/hour, it may be decided to authorize a smaller quota size even if the remaining shared allowance available is relatively high. This information may be used to try and reserve the quota from the account allowance/ balance and to authorize the call accordingly.

Since the ongoing manner of use of the account allowances/balances is being learned in an on-going basis, the future usage of these account allowances/balances may be predicted much more accurately while taking into account the reality of shared allowances/balances. This will help in reducing the number of authorization requests from the network to the charging system thereby also helping to optimize the hardware and network costs for the charging system as well as the communication network.

Figure 5:
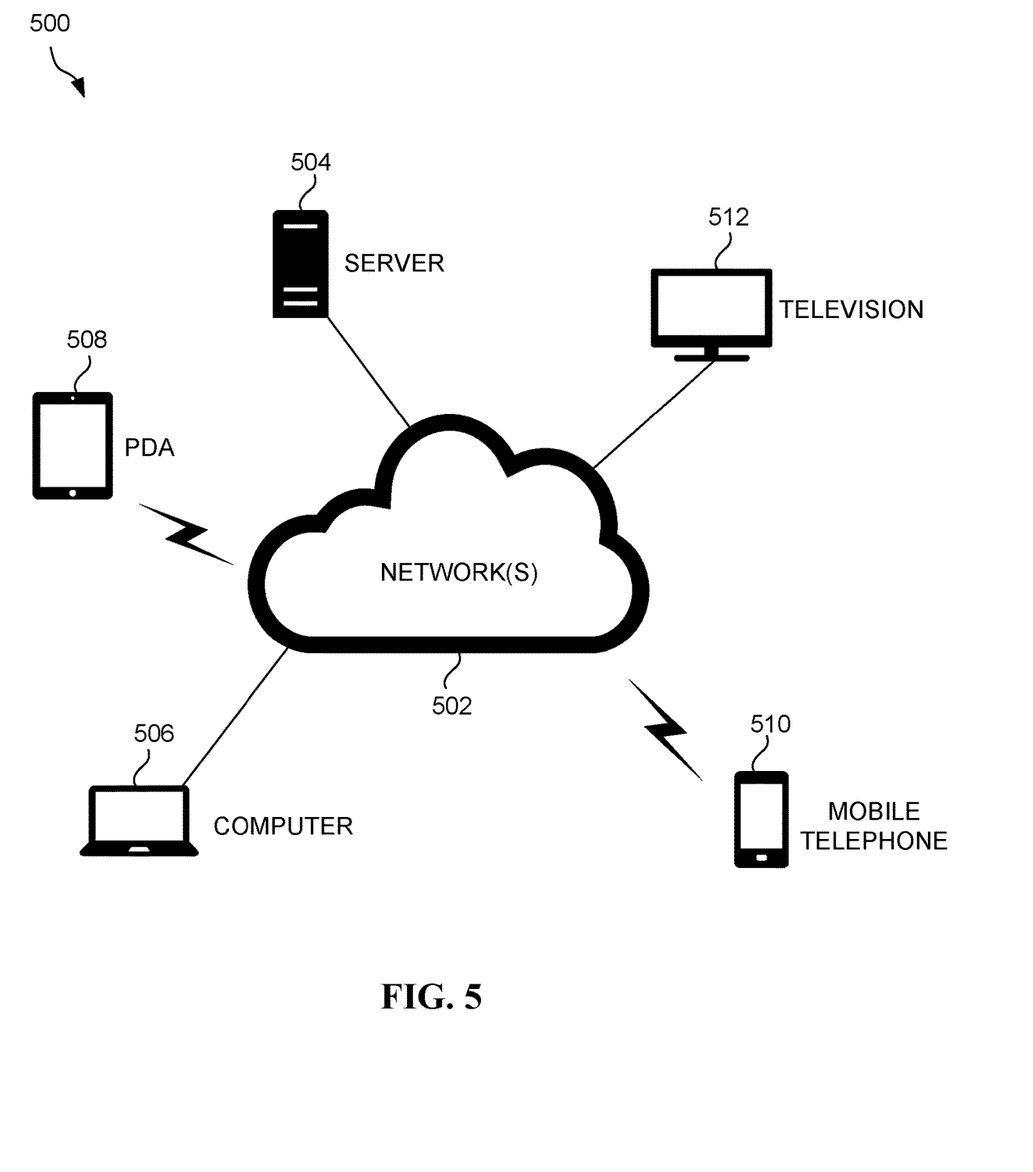
FIG. 5 illustrates a network architecture, in accordance with one possible embodiment.
Figure 6:
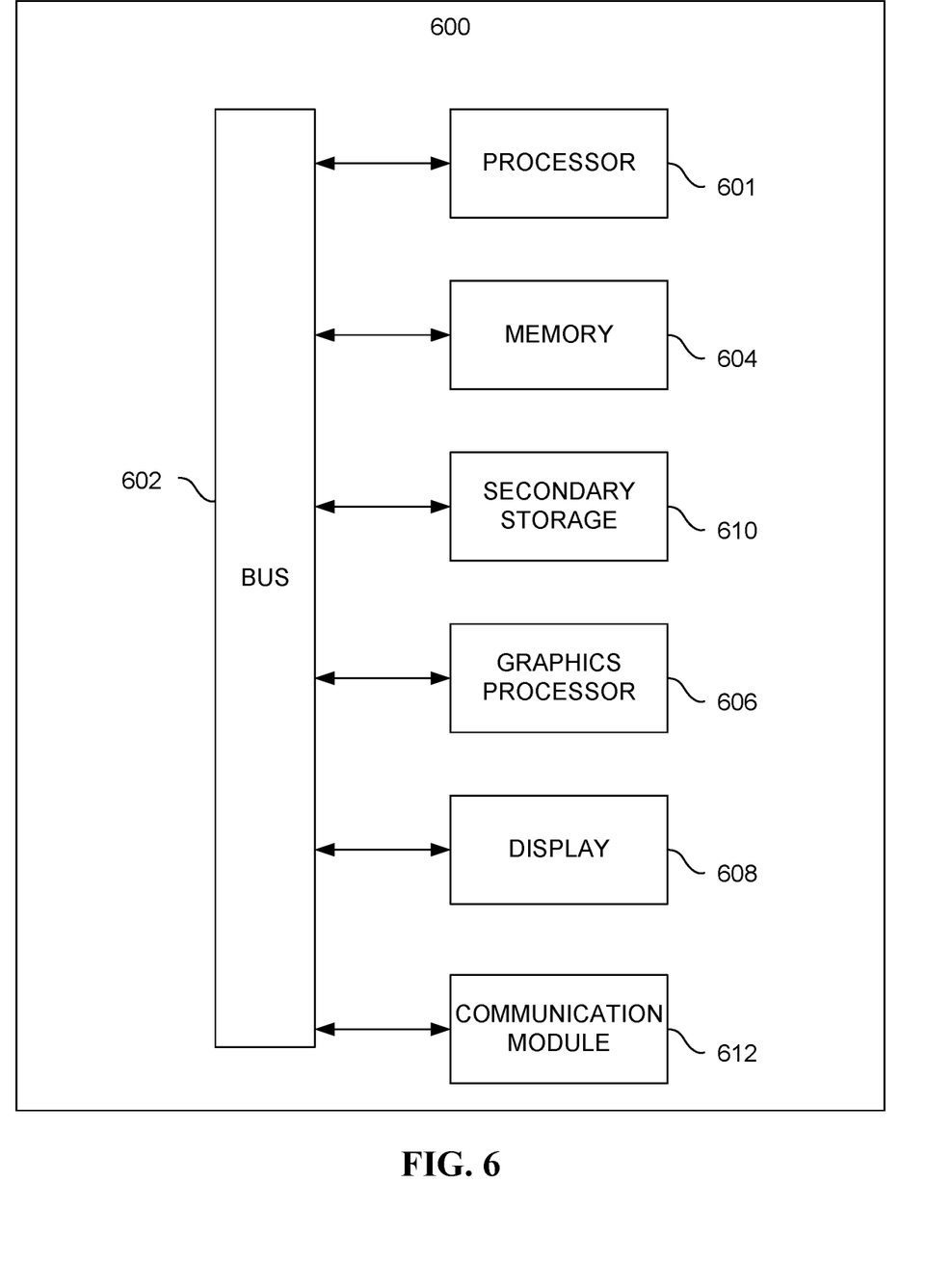
FIG. 6 illustrates an exemplary system, in accordance with one embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the one or more processors to cause the device to:
   identifying a request for use of a network service by an entity;
   determining each account allowance or balance of a plurality of account allowances or balances to which the requested use of the network service can be charged;
   accessing insights generated by an artificial intelligence system that predict at least one of:
   for each account allowance or balance of the plurality of account allowances or balances instances of future use of the network service that will be charged to the account allowance or balance, or
   future use of the network service by other entities;
   determining a quota size to be requested in association with a select account allowance or balance of the plurality of account allowances or balances, based on the request for the use of the network service and the insights;
   generating a reservation request to reserve the quota size from the select account allowance or balance; and
   authorizing the use of the network service, when the quota size is reserved from the select account allowance or balance for the use of the network service.

2. The non-transitory computer-readable media of claim 1, wherein the network service is a communication service.

3. The non-transitory computer-readable media of claim 1, wherein the entity is an end user device.

4. The non-transitory computer-readable media of claim 1, wherein the plurality of account allowances or balances include:
   at least one individual account allowance or balance specific to the entity or a user of the entity, and
   at least one shared account allowance or balance shared by the entity or a user of the entity and at least one additional entity or additional user.

5. The non-transitory computer-readable media of claim 1, wherein the insights are generated by the artificial intelligence system by:
   inputting historical usage data to a machine learning model of the artificial intelligence system that outputs the insights.

6. The non-transitory computer-readable media of claim 5, wherein the historical usage data indicates:
   a plurality of past network service usage events, and
   for each past network service usage event of the plurality of past network service usage events, a particular account allowance or balance to which the past network service usage event was charged.

7. The non-transitory computer-readable media of claim 6, wherein each past network service usage event of the plurality of past network service usage events indicates:
   a particular network service used,
   a particular entity that used the particular network service, and
   a timestamp of the use of the particular network service.

8. The non-transitory computer-readable media of claim 1, further comprising:
   determining a remaining allowance or balance of each account allowance or balance of the plurality of account allowances or balances to which the requested use of the network service can be charged.

9. The non-transitory computer-readable media of claim 8, wherein the quota size to be requested is further determined based on the remaining allowance or balance of each account allowance or balance of the plurality of account allowances or balances to which the requested use of the network service can be charged.

10. The non-transitory computer-readable media of claim 1, wherein the quota size to be requested is determined using predefined policies.

11. A method, comprising:
   at a computer system:
   identifying a request for use of a network service by an entity;

determining each account allowance or balance of a plurality of account allowances or balances to which the requested use of the network service can be charged;

accessing insights generated by an artificial intelligence system that predict at least one of:

for each account allowance or balance of the plurality of account allowances or balances instances of future use of the network service that will be charged to the account allowance or balance, or future use of the network service by other entities;

determining a quota size to be requested in association with a select account allowance or balance of the plurality of account allowances or balances, based on the request for the use of the network service and the insights;

generating a reservation request to reserve the quota size from the select account allowance or balance; and authorizing the use of the network service, when the quota size is reserved from the select account allowance or balance for the use of the network service.

12. The method of claim 11, wherein the network service is a communication service.

13. The method of claim 11, wherein the entity is an end user device.

14. The method of claim 11, wherein the plurality of account allowances or balances include:

at least one individual account allowance or balance specific to the entity or a user of the entity, and at least one shared account allowance or balance shared by the entity or a user of the entity and at least one additional entity or additional user.

15. The method of claim 11, wherein the insights are generated by the artificial intelligence system by:

inputting historical usage data to a machine learning model of the artificial intelligence system that outputs the insights.

16. The method of claim 15, wherein the historical usage data indicates:

a plurality of past network service usage events, and for each past network service usage event of the plurality of past network service usage events, a particular account allowance or balance to which the past network service usage event was charged.

17. The method of claim 16, wherein each past network service usage event of the plurality of past network service usage events indicates:

a particular network service used, a particular entity that used the particular network service, and a timestamp of the use of the particular network service.

18. The method of claim 11, further comprising:

determining a remaining allowance or balance of each account allowance or balance of the plurality of account allowances or balances to which the requested use of the network service can be charged.

19. The method of claim 18, wherein the quota size to be requested is further determined based on the remaining allowance or balance of each account allowance or balance of the plurality of account allowances or balances to which the requested use of the network service can be charged.

20. A system, comprising:

a non-transitory memory storing instructions; and one or more processors in communication with the non-transitory memory that execute the instructions to:

identify a request for use of a network service by an entity;

determine each account allowance or balance of a plurality of account allowances or balances to which the requested use of the network service can be charged;

access insights generated by an artificial intelligence system that predict at least one of:

for each account allowance or balance of the plurality of account allowances or balances instances of future use of the network service that will be charged to the account allowance or balance, or future use of the network service by other entities;

determine a quota size to be requested in association with a select account allowance or balance of the plurality of account allowances or balances, based on the request for the use of the network service and the insights;

generate a reservation request to reserve the quota size from the select account allowance or balance; and authorize the use of the network service, when the quota size is reserved from the select account allowance or balance for the use of the network service.

* * * * *